Figure 1:
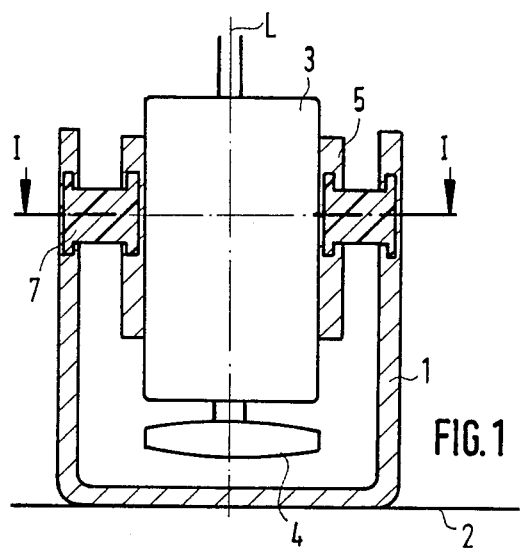

United States Patent [19]

Geupel

[11] Patent Number: 4,768,925
[45] Date of Patent: Sep. 6, 1988

[54] SUPPORT OF A FUEL PUMP IN A FUEL TANK OF A MOTOR VEHICLE

[75] Inventor: Helmut Geupel, Oberhachling, Fed. Rep. of Germany

[73] Assignee: Bayerische Motoren Werke Aktiengesellschaft, Munich, Fed. Rep. of Germany

[21] Appl. No.: 6,060

[22] Filed: Jan. 23, 1987

[30] Foreign Application Priority Data

Jan. 24, 1986 [DE] Fed. Rep. of Germany ....... 3602135

[51] Int. Cl.$^4$ ............................................. F01D 25/24
[52] U.S. Cl. ................................ 415/219 R; 415/135; 417/363; 248/604; 248/638
[58] Field of Search ............ 415/119, 134, 135, 219 R; 417/363; 248/604, 612, 632, 638

[56] References Cited

U.S. PATENT DOCUMENTS

| | | | |
|---|---|---|---|
| 2,936,141 | 5/1960 | Rapata | 248/604 |
| 3,065,941 | 11/1962 | Loftis | 248/604 |
| 4,155,529 | 5/1979 | Maudlin | 417/363 |
| 4,178,955 | 12/1979 | Dau . | |
| 4,636,669 | 1/1987 | Plunkett et al. | 415/119 |

FOREIGN PATENT DOCUMENTS

2723771 12/1978 Fed. Rep. of Germany .
2748963 5/1979 Fed. Rep. of Germany .
3005535 8/1980 Fed. Rep. of Germany .

*Primary Examiner*—Larry I. Schwartz
*Attorney, Agent, or Firm*—Barnes & Thornburg

[57] ABSTRACT

A support of an intank pump at a pump support, which includes webs of elastic material that extend from the pump to the pump support in a direction deviating at an angle α from the radial which is determined by the longitudinal axis of the fuel pump. During swelling of the webs by the fuel, a rotary movement is thereby imparted to the pump without influencing the suction height. The webs may thereby have a relatively large volume as a result of which a good damping is achieved.

17 Claims, 1 Drawing Sheet

SUPPORT OF A FUEL PUMP IN A FUEL TANK OF A MOTOR VEHICLE

The present invention relates to the mounting of an electrically driven fuel pump immersed in the fuel of the fuel tank of a motor vehicle, in which the fuel pump is supported by way of damping elements of elastic material at a pump support that is secured in the fuel tank.

Electrically driven fuel pumps which are submerged in the fuel of the fuel tank of a motor vehicle, are also designated as intank pumps. In motor vehicles with an injection system, the intank pump is arranged generally in a so-called swirl or turbulence pot, into which flows the hot return from the injection system for purposes of degassing. However, the intank pump can also be arranged in the guieting pot (splash baffle) of the fuel tank.

In order to conduct the pump noises in the least possible extent onto the fuel tank, the intank pump must be supported at the pump support, i.e., at the turbulence pot or at the quieting pot in a vibration-damping manner, i.e., must be elastically supported thereon.

For that purposes damping elements of fuel-resistant plastic materials such as NBR or ECO are used which are relatively inexpensive. The fastening of the pump at the pump support can take place, for example, in such a manner that arms are provided at the pump housing which rest on the pump support under interposition of such damping elements, for example, in the form of a disk.

The aforementioned relatively inexpensive plastic materials, however, entail the disadvantage that they swell in the fuel, and more particularly with swell values of 30 to 50%. With the described fastening of the pump at the pump support, this leads to a change of the distance of the pump with respect to the bottom of the fuel tank, i.e., the suction height increases during swelling of the damping elements and therewith the entire fuel volume in the tank can no longer be utilized. One is therefore forced to utilize damping elements of relatively slight thickness and therewith correspondingly lesser noise damping.

If, on the other hand, the damping elements are clamped in concentrically between the pump housing and the inner wall of the turbulence or quieting pot, a swelling leads to the fact that the damping elements will be subjected to greater stress, as a result of which the noise damping is reduced and therebeyond the pump may experience an inclined positioning within the pot.

In order to achieve a sufficient noise damping, one therefore has to have recourse heretofore to synthetic plastic materials which exhibit small swelling values, for example, to VITON$^{(R)}$ of the DuPont oOmpany (a fluoro-elastomer on the basis of vinylidene fluoride hexafluoropropylenecopolymerisat). Such plastic materials, however, are very expensive.

The present invention is therefore concerned with the task to provide a mounting for an intank pump which leads to a satisfactory noise damping combined with low costs.

According to the present invention, the pump is connected with the pump support by way of webs which extend in a direction that deviates from the radial that is determined by the longitudinal axis of the fuel pump. During the swelling of the damping elements, respectively, of the webs, a rotary movement is thereby imparted to the pump about its longitudinal axis which, however, does not influence either the suction height of the pump above the tank bottom or does not reduce the noise damping. This means a good damping with constant suction height of the intank pump is achieved by the present invention.

Figure 2:
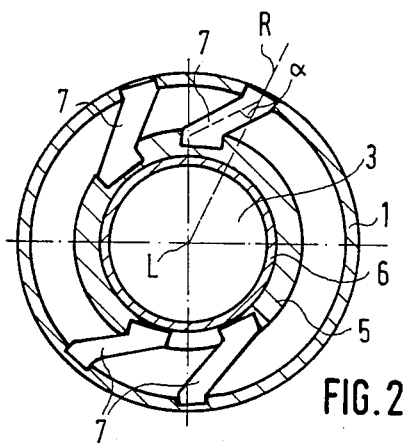

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through an intank pump in the turbulence pot of a motor vehicle fuel tank in accordance with the present invention; and FIG. 2 is a cross-sectional view, taken along line I—I in FIG. 1, whereby only the housing is shown of the intank pump.

Referring now to the drawing wherein like reference numerals are used throughout the two views to designate like parts, a turbulence pot 1 is arranged on the bottom of a fuel tank. The intank pump 3 which is located within the turbulence pot 1 includes a filter 4 at its lower side, i.e., the suction side of the pump 3. The pump 3 is arranged in a sleeve-shaped mounting device 5 which is secured at the housing 6 of the pump 3.

The turbulence pot 1 serves as support of the pump 3. Several webs 7 extends from the pump 3 to the turbulence pot 1 for the elastic support of the pump. The webs 7 consist of elastic material, for example, of NBR or ECO.

The individual webs 7 are constructed identically, i.e., of the same length and of the same cross section. They are characterized in that they extend from the pump 3 to the turbulence pot 1 in a direction which intersects the radial R, that is determined by the longitudinal axis L of the pump 3, with an angle $\alpha$ that is greater than zero, preferably amounts to more than 10°. The angle $\alpha$ is thereby the same for all the webs 7.

In the embodiment illustrated in the drawing, the webs 7 therefore extend at an angle $\alpha$ of about 40° in a tangential direction in relation to the mounting device 5, respectively, the pump housing 6.

In this manner, a rotary movement is imparted to the pump 3 about its longitudinal axis L during the swelling of the webs 7. As a result thereof, the distance of the pump 3, respectively, of the filter 4 with respect to the bottom 2 of the fuel tank remains unchanged. The webs 7 can therefore be constructed relatively large, i.e., with a large damping volume so that a great noise damping is realizable. At the same time, no stresses of the webs 7 occur during the swelling thereof so that the noise damping properties thereof are not influenced by the swelling occurence.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A mounting arrangement for an electrically driven fuel pump which is immersible in fuel in a fuel tank, said mounting arrangement comprising:
   pump support means fixedly disposable in a fuel tank, and a plurality of damping web means of substantially equal length and extendable from outer circumferential portions of a pump to said support means to support the pump in position on the support means, said damping web means all extending at approximately the same angle with respect to respective radii extending from a longitudinal axis of a fuel pump being supported thereby to respective support connections of radial outer ends of the damping web means at the pump support means, whereby expansion movements of the damping web means are accommodated by rotational movement of a pump being supported about its longitudinal axis without substantially changing its axial position.

2. A mounting arrangement according to claim 1, wherein said web means all have an approximately similar cross section.

3. A mounting arrangement according to claim 2, wherein the fuel pump includes a cylindrical housing and the web means extend substantially tangentially to the housing.

4. A mounting arrangement according to claim 3, wherein said housing is seated in a mounting means and the web means are secured at the mounting means.

5. A mounting arrangement according to claim 4, wherein the elastic material from which the web means are made is NBR or ECO.

6. A mounting arrangement according to claim 5, wherein said support means is formed by a pot arranged at a bottom of the fuel tank.

7. A mounting arrangement according to claim 6, wherein the pot is a turbulence pot.

8. A mounting arrangement according to claim 6, wherein the pot is a quieting pot.

9. A mounting arrangement according to claim 1, wherein the fuel pump includes a cylindrical housing and the web means extend substantially tangentially to the housing.

10. A mounting arrangement according to claim 9, wherein said web means all have an approximately similar cross section.

11. A mounting arrangement according to claim 9, wherein said housing is seated in a mounting means and the web means are secured at the mounting means.

12. A mounting arrangement according to claim 1, wherein the elastic material from which the web means are made is NBR or ECO.

13. A mounting arrangement according to claim 1, wherein said support means is formed by a pot arranged at the bottom of the fuel tank.

14. A mounting arrangement according to claim 13, wherein the pot is a turbulence pot.

15. A mounting arrangement according to claim 13, wherein the pot is a quieting pot.

16. An arrangement according to claim 1, wherein said angle is between 10 and 40 degrees.

17. An arrangement according to claim 16, wherein said angle is approximately 40 degrees.

* * * * *